Feb. 26, 1957     H. KRUFT     2,782,917
NEEDLE DISPENSING BOX
Filed Feb. 4, 1953     2 Sheets-Sheet 1

INVENTOR.
Henrik Kruft
BY Freeman - Memork
Agents

Feb. 26, 1957 H. KRUFT 2,782,917
NEEDLE DISPENSING BOX
Filed Feb. 4, 1953 2 Sheets-Sheet 2
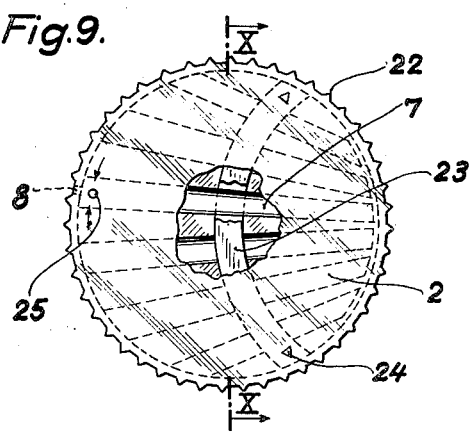
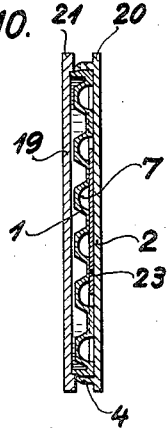
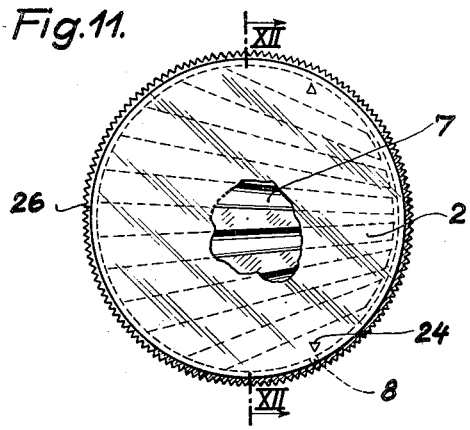
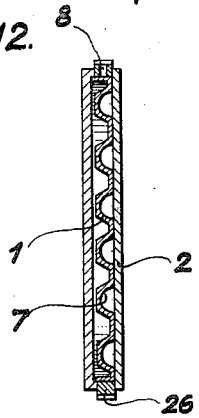
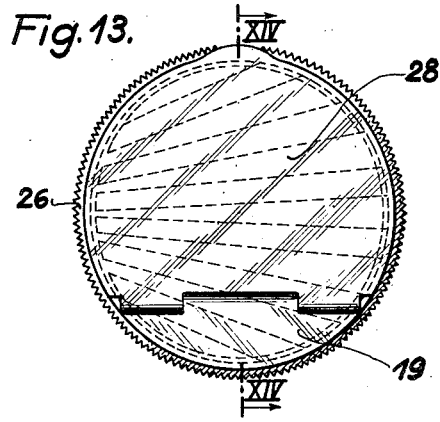
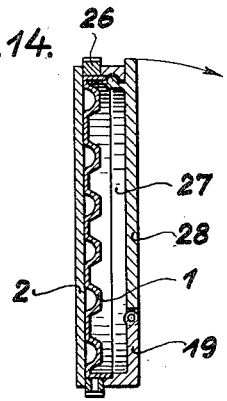
INVENTOR.
Henrich Kruft
BY

2,782,917

NEEDLE DISPENSING BOX

Heinrich Kruft, Dusseldorf, Germany

Application February 4, 1953, Serial No. 335,126

Claims priority, application Germany April 17, 1952

2 Claims. (Cl. 206—66)

The present invention relates to a round box serving to hold goods of any kind such as tablets, balls, pearls, and in particular needle-shaped objects such as sewing needles, lead mines, dental or surgical instruments, and more particularly the invention relates to boxes of the kind described allowing single pieces of its contents to be taken out.

As compared with boxes known in the art and serving the same purpose, the box according to the invention, made of artificial material, has a turnable edge portion on its periphery with one or several openings for taking out the contents. The edge of the lid may on its inside be provided with a groove, and the edge of the lower portion with a corresponding bulge or spring, and either edge portion has an opening serving as a passageway for the contents. The single parts, and particularly the lid, being made of artificial material, the upper portion and the lower one can be pressed together readily owing to the edge of the lid being slightly resilient, which permits a most simple construction of the round box. By turning the lid, the passage opening of the lower portion may be brought into a position adjacent to the passage opening of the lid so that the contents may then be taken out through these openings without difficulty. To prevent undesired rotation in relation to each other of the lower portion and the lid, a small locking cam or the like—as known in the art—may be provided at any point.

When such a round box is to be used for packing needle-shaped objects, the lower portion may be provided with an insert piece having grooves or the like which extend radially and are of different lengths so that for example sewing needles of different sizes may be inserted.

Further objects and advantages of the present invention will be apparent from the following description reference being made to the accompanying drawings wherein a preferred embodiment of the present invention is clearly shown.

Figure 9 is a top view of a box with a serrated edge;

Figure 10 is a section taken on the line X—X of Figure 9;

Figure 11 is a top view of a box with a fixed lid;

Figure 12 is a section taken on the line XII—XII of Figure 11;

Figure 13 is a view of a box with a snap lid seen from below;

Figure 14 is a section taken on the line XIV—XIV of Figure 13.

Figure 4:
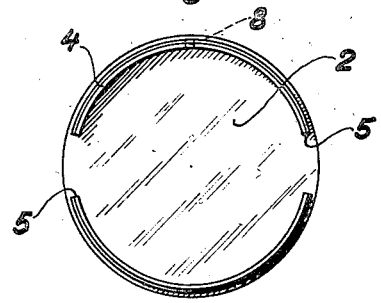
Figure 4 is a view of the lower side of the lid.

The box as illustrated in the drawing consists of the lower portion 1 and the lid 2, both parts being circular. The edge 3 of the lower portion extending upwardly has a bulge on the outside, while the edge 4 of the lid 2 extending downwardly has a corresponding groove, so that these two parts engage each other with key and slot and the lid may be turned on the lower portion. As shown in Figure 4, the edge 4 of the lid 2 may have two opposite gaps 5 serving to pass through sliding parts or the like of the press mould. However, more than two gaps may be provided, it has only to be observed that the edge 4 is so high that the lid will be securely held on the edge 3 of the lower portion.

Figure 1:
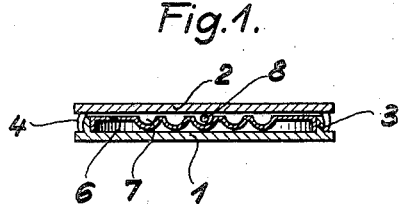
Figure 1 is a cross section of a box taken on the line I—I of Figure 2.
Figure 3:
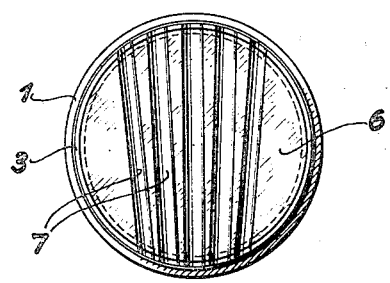
Figure 3 is a top view of the lower portion.
Figure 2:
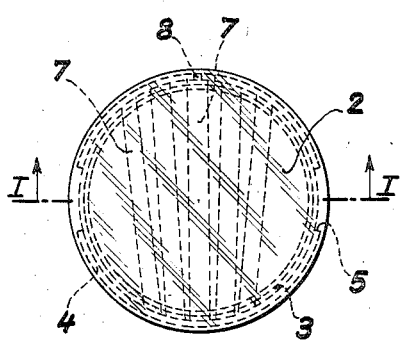
Figure 2 is a top view.

When such a round box is intended to be used for keeping needle-shaped goods such as for example sewing needles, the lower portion may be provided with an inserted portion 6 having radial grooves 7 as shown in Figures 1 to 3. The needles are laid into these grooves, which may receive needles of different sizes. The grooves extend through the edge 3 of the lower box portion, while the edge 4 of the lid is provided with but one opening (hole) 8 which opening may however be brought into line with the end of each of said grooves so that the needles lying in said grooves may be taken out of the receptacle. To enable the lid to be retained in a locking position locking means in the form of cams, stops or the like (not shown in the drawing) may be provided.

Figures 5, 6:
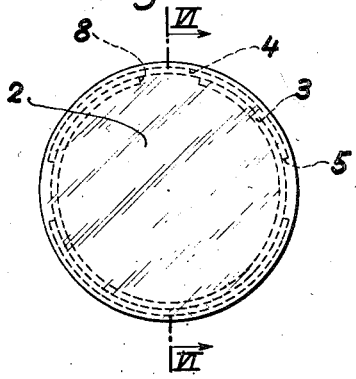
Figure 5 is a view of another embodiment.
Figure 6 is a section taken on the line VI—VI of Figure 5.
Figure 7:
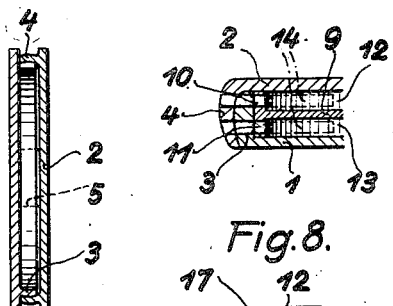
Figure 7 is a cross section on an enlarged scale of a variation.

Figures 5 to 6 illustrate a box to be used for tablets or pearls or the like which do not require a special insert portion. The edge 3 of the lower portion has an opening 8 corresponding in size to that of the objects contained in the box. The edge 4 of the lid 2 being provided with gaps 5 as mentioned above, a tablet may be taken out by turning the lid to a position where one such gap lies adjacent to the opening 8. Means may be provided for locking the lid in a position in which the gaps 5 and the opening 8 are out of line. As shown in Figure 7 an intermediate bottom 9 may be inserted into the box. Said bottom may be provided with apertured spacing edges 10 and 11 or the like. In this way two divisions 12 and 13 are obtained for inserting tables 14 or the like. The edge 3 of the lower portion and the edge 4 of the lid are provided with two openings each so that e. g. a tablet may be taken out either from the upper division 12 or the lower one 13. In this instance, too, the edge 4 of the lid embraces the edge 3 of the lower portion 1 which in addition, of course, may have a bottom protruding peripherally as shown in Figure 1.

Figure 8:
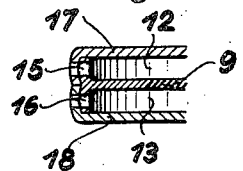
Figure 8 is a cross section of another embodiment.

Figure 8 shows a similar embodiment with an intermediate bottom 9 which, however, has two edge portions 15 and 16, lids 17 and 18 being from either side pressed upon said portions 15 and 16. In this design, each lid may be turned for itself when something is to be got out of the upper division 12 or the lower one 13.

The round box shown in Figures 9 and 10 comprises a lower portion 1 which has a special bottom 19, the two parts being securely attached to each other for example by gluing. A lid 2, the edge 4 of which may have a groove which engages with a corresponding bulge of the lower portion 1, enables these two parts to be rotated in relation to each other. Both the edge 20 of the lid 2 and the outer edge 21 of the bottom 19 may be provided with small teeth to facilitate handling (Figure 9).

To prevent very thin needles inserted from jamming between the lower portion 1 and the lid 2, the invention provides laying a thin ribbon 23 of artificial material over the grooves 7. This ribbon remains in its position even when the lid 2 is turned so that the needles put in are retained in the grooves 7. This ribbon 23 may vary in colour to make the box more attractive, and may have self-lighting paint so as to become better visible especially in darkness. Moreover the ribbon may show inscriptions or the like.

To protect, especially in tropic climate, the packed ware as for example needles from rust, a paper strip or the like with an anti-corrosion agent—not shown in the drawing—may be disposed below the ribbon 23, said paper strip being covered and retained by said ribbon. In a conventional manner, this paper strip may for example be provided with a chemical agent preventing corrosion by vaporizing and giving up part of its substance to the air within the receptacle.

At the end of the ribbon, there may be provided a mark 24 indicating that the receptacle is closed when the outlet opening 8 is placed there. Moreover the lid may bear a mark 25 showing where the outlet opening 8 is located.

In the embodiments according to Figures 11 and 12, the lid 2 is securely attached to the lower portion 1 for example by gluing so that it is no longer possible for a needle to move upwardly out of the grooves 7. The edge of the lid is made in the form of a special ring 26 which on its periphery may be provided with an indentation so that it may be turned easily. It is this ring 26 that has the required opening 8 enabling inserted needles or the like to be removed from the box.

As shown in Figures 13 and 14, such a round box may have an additional division 27 obtained by providing the bottom 19 with a snap lid 28 which is for example hingedly connected to the bottom 19. For the rest, this design corresponds to the one shown in Figures 11 and 12, i. e. the lid 2 is securely attached to the lower portion 1 while the ring 26 is turnable. Of course, a box according to Figures 9 and 10 may in like manner be provided with an additional division 27. This division may for instance receive darning yarn, safety pins or the like so that the box represents a complete sewing case.

Moreover, the snap lid may on its inside or outside be provided with a mirror. Similarly, the bottom of a box shown in the other figures may bear a mirror on the outside.

What I claim is:

1. In a circular box for the accommodation of needles and needle-shaped articles a circular bottom, a circular lid having a circumferentially dependent side wall and a circular sheet having an outwardly bulged peripheral edge being located between said bottom and said lid and secured to said bottom, said circular sheet having straight grooves in its upper face extending from edge to edge of the sheet in a fan-shaped arrangement to harbor said needles and needle-shaped articles, said dependent side wall having a circumferential groove applied to the outer periphery of said circular sheet to retain and rotatably guide said lid, the dependent side wall being provided with an outlet opening adapted to register selectively with each of the ends of the straight grooves for removal and replacement of the articles therein.

2. In a circular box according to claim 1, said circular sheet having an arcuate groove extending transversely across said straight grooves, and a ribbon secured in said arcuate groove.

References Cited in the file of this patent

UNITED STATES PATENTS

| | | | |
|---|---|---|---|
| D. 160,312 | Fuller | Oct. 3, | 1950 |
| 229,543 | Maynard | July 6, | 1880 |
| 975,681 | Ernsberger | Nov. 15, | 1910 |
| 2,103,520 | Donnelly | Dec. 28, | 1937 |
| 2,194,009 | Conner | Mar. 19, | 1940 |
| 2,204,784 | Abrams | June 18, | 1940 |
| 2,214,437 | Punte et al. | Sept. 10, | 1940 |
| 2,236,224 | Raschkind | Mar. 25, | 1941 |
| 2,310,740 | Leavy | Feb. 9, | 1943 |
| 2,412,332 | Hansen | Dec. 10, | 1946 |
| 2,424,112 | Nehrke | July 15, | 1947 |
| 2,446,383 | Motz | Aug. 3, | 1948 |
| 2,491,617 | Lebach | Dec. 20, | 1949 |
| 2,549,681 | Goldstaub | Apr. 17, | 1951 |
| 2,573,311 | Cupler | Oct. 30, | 1951 |
| 2,643,176 | Wachter et al. | June 23, | 1953 |

FOREIGN PATENTS

| | | | |
|---|---|---|---|
| 25,412 | Great Britain | Nov. 25, | 1908 |